Jan. 11, 1927.  1,614,279
G. CARRINGTON
STEERING DEVICE FOR VEHICLES
Filed July 24, 1926
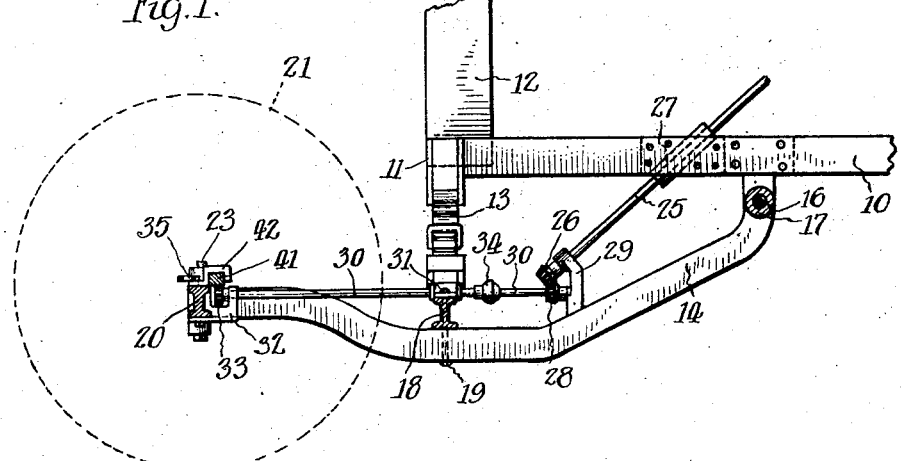
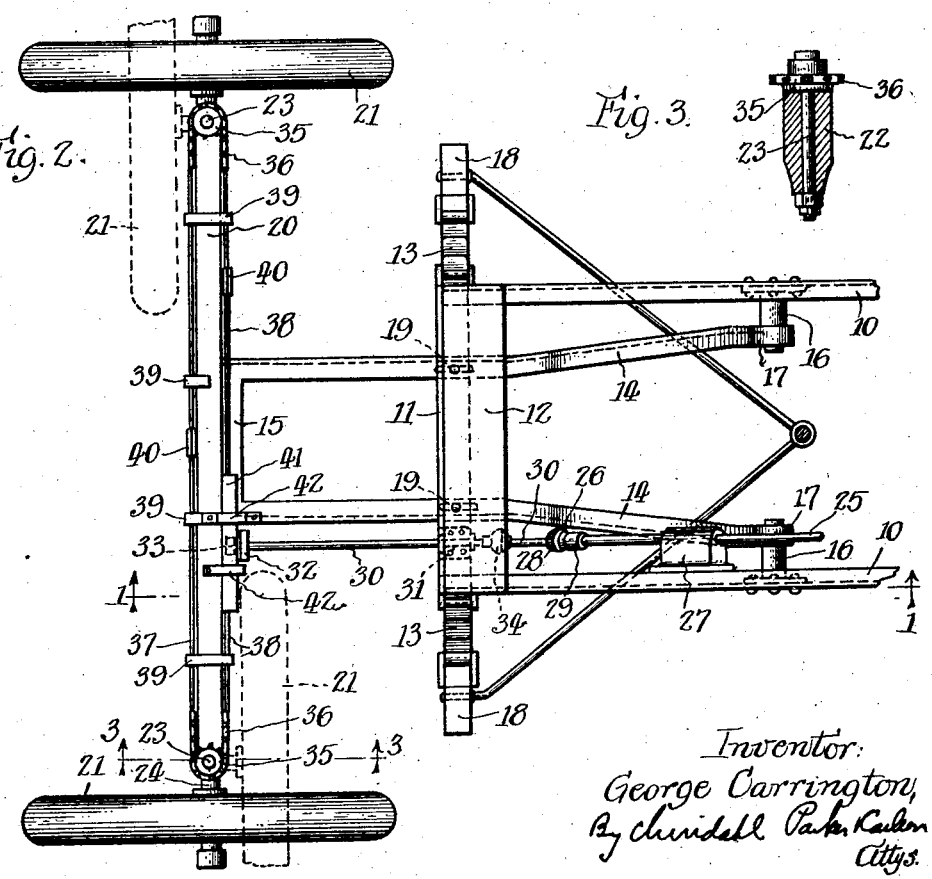
Inventor:
George Carrington,
By Churchill Parker Karlen
Attys.

Patented Jan. 11, 1927.

1,614,279

UNITED STATES PATENT OFFICE.

GEORGE CARRINGTON, OF CHICAGO, ILLINOIS.

STEERING DEVICE FOR VEHICLES.

Application filed July 24, 1926. Serial No. 124,563.

This invention pertains to a new and improved steering device for vehicles.

In operating motor vehicles under modern traffic conditions, particularly in large cities where traffic lanes and parking spaces are congested, it is often desirable to make sharp short turns in order to avoid accidents or to get into or out of a desired position. Particularly is this true when it is desired to park in or move from a small space between other parked vehicles.

It is therefore the primary object of the invention to provide a novel construction permitting a wide range of swinging movement of the front wheels.

A further object is to provide a novel steering attachment for vehicles whereby the steering wheels are positioned a substantial distance ahead of the chassis to permit freedom of movement thereof through a large arc.

Another object resides in the provision of an attachment for vehicles comprising an extension for the chassis, which extension carries an auxiliary axle and the steering wheels, and permits the wheels to be swung through an arc of substantially 180 degrees.

Other objects and advantages will become apparent from the following description and the enclosed drawings, in which:

Fig. 1 is a view taken on the line 1—1 of Fig. 2.

Fig. 2 is a plan view of the front end of the chassis of an automobile to which the preferred form of the invention has been applied.

Fig. 3 is an enlarged fragmentary section taken on a line 3—3 of Fig. 2 and showing the preferred means of swinging the front wheels.

In general this invention constitutes an attachment for any automobile, and comprises means for moving and pivotally supporting the front wheels thereof in a position in which they cannot strike against the frame of the car, and means for operating said front wheels to guide the car, said means being operable to turn the wheels through substantially a complete semicircle.

Referring to the drawings, I have shown somewhat diagrammatically the front end of a chassis of an automobile having side members 10 and a front member 11 upon which the radiator 12 is supported. In the type of automobile in which I have chosen to portray this invention, a single front spring 13 is secured in a position beneath the front chassis member 11 and extends across the chassis in a direction transverse to the length thereof.

My attachment in its present embodiment includes a substantially U-shaped frame comprising a pair of side members 14 and a front member 15. The free ends of the members 14 are arranged to be secured to the side chassis members 10 in a manner which permits free up and down pivotal movement of the frame relative to the chassis. The means for effecting this connection preferably comprises a pair of stub shafts 16 rigidly secured to the chassis members 10, said shafts being journaled in suitable bearings 17 in the frame members 14.

The usual front axle 18 of the automobile to which the spring 13 is pivotally secured has its ends, to which the wheels are normally secured, cut away just beyond the ends of the spring. If desired, the front axle may be completely removed and a suitably formed bar substituted therefor. As shown in Fig. 1, the U-frame is formed to extend forwardly underneath the axle 18. The frame and the axle are firmly secured together in any suitable manner as by means of brackets 19.

To the front member 15 of the U-frame, an auxiliary axle 20 is secured extending substantially parallel to the axle 18. Front wheels 21 are pivotally mounted on the ends of the axle 20 in the usual manner as by a yoke 22 on the axle, and a bolt or pivot pin 23 rigid with the stub axle 24 of the wheel, said bolt being pivoted in the yoke.

The frame thus provided, positions the front wheels 21 forwardly of the chassis a distance sufficient to permit the wheels to be swung from a position parallel to and in front of the auxiliary axle 20 to a similar position behind said axle.

Means of any suitable construction by which the front wheels in their advanced position may be swung pivotally, is provided. It has been found that the usual method of turning the wheels as by a steering arm, is not particularly adaptable for turning the wheels through a large arc. This is due largely to the fact that a steering arm, during the turning operation, as it nears either end of a large arc, will approach a dead center at which point the leverage of the arm is lost. I prefer therefore to employ the hereinafter described mechanism whereby such dead centers are eliminated.

In the present instance the original steering post in the automobile is replaced by a longer post 25 to the end of which a bevel gear 26 is secured. The post 25 is rotatably secured in a bracket 27 rigid with the chassis member 10. The bevel gear 26 is arranged to mesh with a gear 28, the two gears 26 and 28 being held against disengagement by a suitable bearing bracket 29 attached to the frame member 14. The gear 28 is secured on the end of a rod 30 which extends forwardly through a bearing 31 on the axle 18 into a bearing 32 on the auxiliary axle 20. A pinion 33 is secured to the front end of the rod 30. The rod 30 consists of two separate parts between which a suitable universal joint 34 is interposed to permit relative pivotal movement.

Rigidly secured to the upper end of each of the bolts 23 is a sprocket wheel 35 which upon being rotated will cause the front wheels 21 to pivot. Each sprocket wheel 35 is engaged by a length of chain 36, and the ends of the chains are connected by parallel rods 37 and 38. The chains and rods are held for sliding reciprocal movement by any suitable means such as a plurality of guides 39. Means is also provided for adjusting the chains and for tightening the assembly if necessary, this means being shown herein as a pair of turn-buckles 40. The inner rod 38 is provided with a rack 41 which is slidably disposed in guides 42 on the axle 20 and which engages the pinion 33 on the rod 30.

The installation of the attachment is very simple and is easily accomplished. The stub shafts 16 are attached to the chassis member 10. The original axle 18 is either shortened or a substitute short axle is installed, and the U-frame is secured thereto. The original steering post is replaced by a post 25 of proper length, and the bearings 27, 29 and 31 which support different parts of the steering mechanism are properly secured in place.

Rotation of the steering wheel (not shown) causes rotation of the post 25 which motion is transmitted through the gears 26 and 28, universal joint 34, rack 33, and pinion 41, rods 37 and 38, chains 36 and sprocket wheels 35, to turn the wheels 21.

The shock absorbing function of the spring 13 is not altered by the attachment since the pivotal connection between the chassis and the U-frame, because of the manner in which the front end of the chassis is supported on the frame intermediate the opposite ends thereof, permits the spring to act in the usual manner. Since a limited swinging action between the attachment and the chassis is thus possible, the universal joint 34 has been incorporated in the steering mechanism.

It will be apparent from the foregoing disclosure that I have provided a simple and effective attachment for an automobile by means of which the front wheels may be turned through almost a complete semicircle. In other words, it is possible by means of this device to turn the wheels in either direction to a position substantially at right angles to their normal direction of travel. Such a wide range of movement greatly facilitates parking and increases the ease with which an automobile may be handled in traffic.

Although the invention is susceptible of various modifications and alternative constructions, I have shown and herein described in detail the preferred embodiment but it is to be understood that I do not thereby intend to limit the invention to the specific form disclosed, but intend to cover all modifications and alternative constructions falling within the spirit and scope of the invention as expressed in the appended claims.

I claim as my invention:

1. An automobile having, in combination, a chassis, a horizontal member resiliently mounted on the front end of said chassis and extending transversely of the length thereof, an extension secured to said chassis and said horizontal member and extending forwardly thereof, an axle mounted in the forward end of said extension, wheels pivotally connected for swinging movement at the ends of said axle, and steering means for said wheels, said wheels being spaced laterally a distance from said extension sufficient to permit pivotal swinging movement thereof through a range limited only by said axle.

2. An attachment for vehicles having, in combination with the chassis and the front axle of the vehicle, a frame adapted to be pivotally connected to said chassis and rigidly connected to said front axle with said frame extending forwardly of said axle, an auxiliary axle mounted in the front end of said frame, a pair of wheels connected for swinging movement to the ends of said auxiliary axle, and a steering device connected to said wheels, said wheels being positioned at a distance from the sides of said frame sufficient to permit a wide range of movement.

3. An attachment having, in combination with the chassis and front axle of a vehicle, an auxiliary axle positioned in front of the chassis, means for connecting said auxiliary axle to said chassis, said means being arranged to support said first mentioned axle, wheels connected for swinging movement to the ends of said auxiliary axle, and means for steering said wheels.

4. An automobile having, in combination, a chassis, an axle underlying said chassis and extending transversely thereof, spring means between said axle and said chassis to support said chassis, said spring permitting limited relative vertical movement therebetween, an extension frame pivotally secured to said chassis and underlying said axle, said frame being substantially narrower than said chassis, an auxiliary axle mounted in the front end of said frame, a pair of wheels connected for swinging movement to the ends of said auxiliary axle, means for swinging said wheels simultaneously, said means including a part connected to said first mentioned axle, and a part connected to said chassis, and a universal joint between said parts to permit said vertical movement.

In testimony whereof, I have hereunto affixed my signature.

GEORGE CARRINGTON.